Oct. 31, 1944.     P. B. TAYLOR     2,361,436
RADIO DIRECTION FINDER
Filed Nov. 18, 1937     2 Sheets-Sheet 1
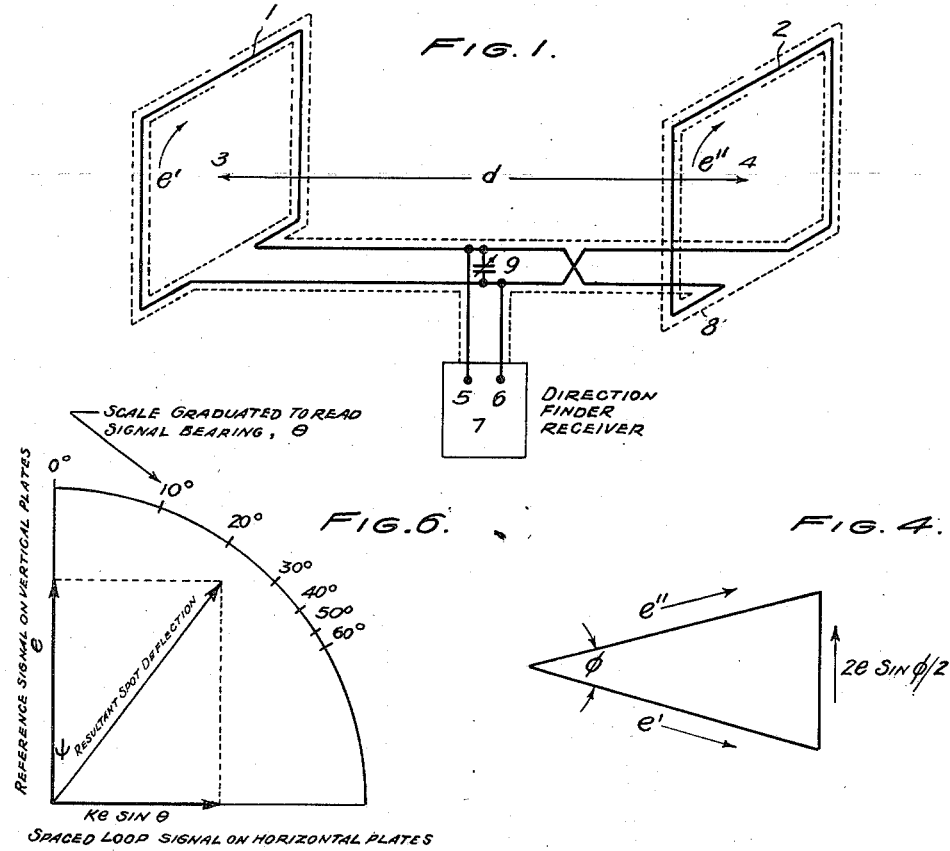
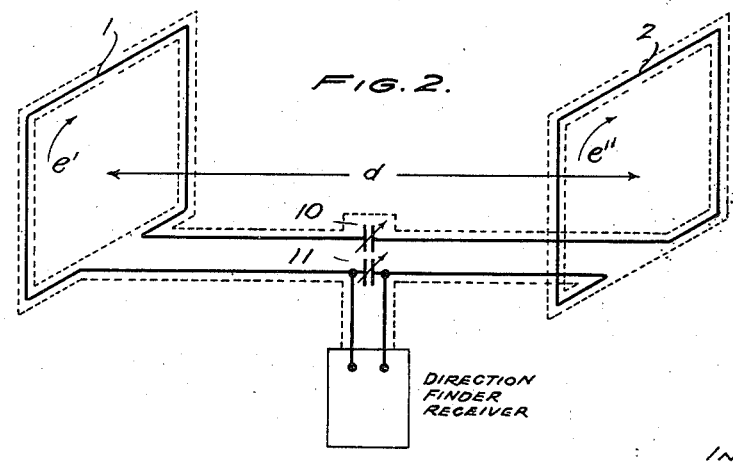
INVENTOR
PAUL B. TAYLOR
ATTORNEYS Oct. 31, 1944.  P. B. TAYLOR  2,361,436
RADIO DIRECTION FINDER
Filed Nov. 18, 1937    2 Sheets-Sheet 2
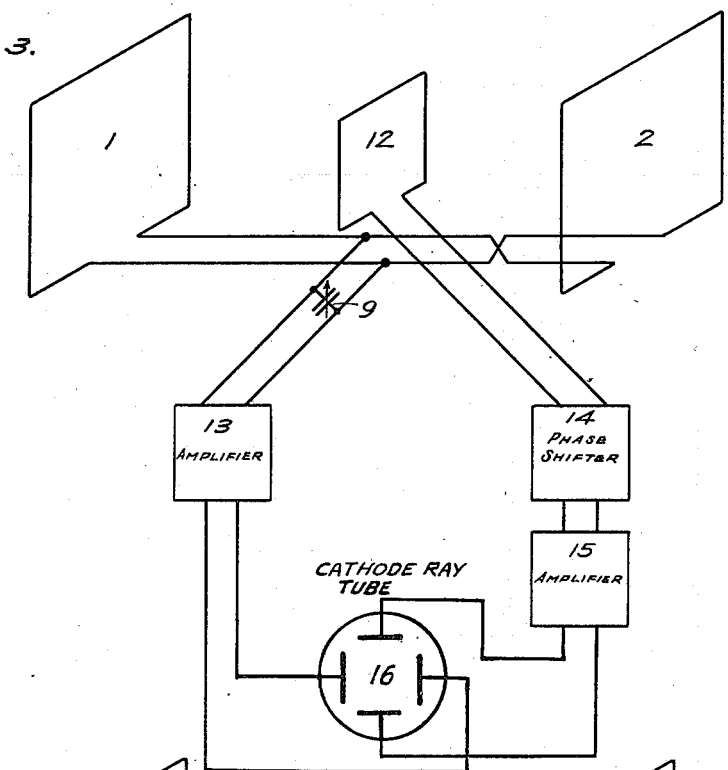
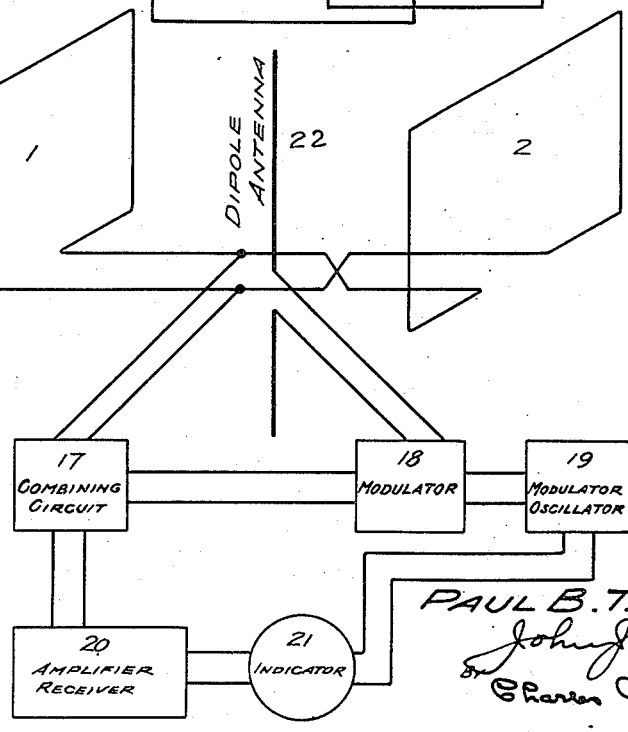

Patented Oct. 31, 1944

2,361,436

UNITED STATES PATENT OFFICE 2,361,436

RADIO DIRECTION FINDER

Paul B. Taylor, Dayton, Ohio

Application November 18, 1937, Serial No. 175,219

19 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio direction finders and proposes a system in which the principle of phase relationship of spaced loop antenas is employed to obtain a directional indication of a source of electromagnetic wave energy.

It is well known that the common loop antenna is inaccurate as a direction finder when the received wave or beam makes an angle to the horizontal, the error being generally known as night effect. It is an important object of the present invention to overcome night effect.

Another important object of the invention is to provide means whereby very small loop separations are possible, thus making the apparatus more compact.

It is also an object of the invention to give accurate indication and to define one true course without ninety degree or one hundred and eighty degrees ambiguity. Other objects will appear as the description proceeds.

The invention will be described with reference to the accompanying drawings, in which:

Fig. 1 shows an embodiment of the invention in which the loops are connected in parallel;

Fig. 2 illustrates an embodilment in which the loops are shown connected in series;

Fig. 3 shows a modified form in which the spaced identical loops are employed with a separate reference loop.

Fig. 4 is a vector diagram depicting the phase relationships between the voltages $e'$ and $e''$ induced separately in the two loops, and their effective resultant E. M. F. expressed by $2 \sin \phi/2$;

Fig. 5 shows another embodiment of the invention in which spaced loops are employed with a separate reference antenna of the vertical type; and Fig. 6 illustrates diagrammatically the functioning of a cathode ray tube indicator employed as in Fig. 3.

One form of direction finder system which is largely free from night effect error is known as the Adcock antenna system. Another form of system also free from night effect error embodies an arrangement of spaced loops. The spaced loop direction finder may be regarded as an Adcock system where loops are substituted for vertical antennas, and the theory of operation is similar, being based on the difference of phase of the signals in the two loops, which is due to the difference of time of arrival of the received signal at the two separated loops.

The present invention comprises an arrangement of identical separated loop antennas, the planes of the loops being perpendicular to a common axis passing through their centers. Such an arrangement is shown in Fig. 1 of the drawings, which will be hereinafter described more in detail. In general the voltages generated in the two loops by any plane wave are equal in magnitude but different in phase by an amount which may be denoted by the character $\phi$. In this connection, attention is called to the following equation:

$$\phi = \frac{2\pi d \sin \theta}{L} \text{ radians}$$

where $d$ = separation between loops
$L$ = wave length of received signal
$\theta$ = angle between ray and the plane of the loops.

If the loops are oriented so that the ray lies in the loop plane, the phase difference is zero. If then the signals from the two loops are combined differentially, being equal in magnitude and opposite in phase, their resultant should be zero. For any other direction of the ray there will be a difference of phase and the resultant will not be zero (except when the separate signals vanish). It is the vanishing of the resultant signal which is used to locate the direction of arrival of the wave. If the loops are vertical the bearing sought will be the horizontal line through the plane of the loops.

In the prior art pertaining to systems in which spaced loops are employed, separation of the loops has been large—of the order of a half wave length. For the purpose of mounting in any restricted space or position, as, for instance, on an airplane, it is desirable that the separation be greatly reduced. Another advantage of small separation lies in the increased freedom from "diversity effect," that is, the effect of irregularities of phase, polarization and intensity between widely separated points due to inhomogeneity of the radio waves. If the separation of the spaced loops be reduced, however, the difference in phase between the signal outputs becomes very small, even when the incoming wave is at a considerable angle to the plane of the loops, and the difference of phase due to unequal tuning of the two loops or to other differences between the two pick-up circuits becomes greater than the difference in phase which is to be detected. For instance, with a loop separation of one meter, a wave length of 50 meters and an angular displacement of the ray or beam from the loop plane of 5 degrees the phase difference between the signals is only 38 minutes and the resultant differential signal is reduced to only .05 of the signal to be obtained from one of the loops separately.

In the present invention a short separation is made practicable by combining the two signal pick-up circuits in such a manner that the very small differences of phase between the component signals are preserved correctly and obscuring effects are prevented.

It is well known in electrical theory that the degree of connection between two parts of a circuit may be varied according to the nature of the intervening circuit elements. This variable degree of coupling is most commonly recognized in transformer coupling, but exists for all circuits of whatever nature. In general, it may be said that as the coupling approaches 100 per cent the possibility of phase displacement between the two signals due to mistuning of any part of the circuit is diminished. This is because the multiple resonance frequencies of a multiple branched circuit are thereby reduced to a single frequency. In practice the tightest coupling between the parts of a circuit is usually obtained by pure conductive coupling, but at high frequencies this may be difficult to effect due to stray reactances.

In the present invention phase error is therefore minimized by combining the pick-up circuits of the loops in a network in which the impedance of the circuit in which the pick-up voltages act in series is minimized and/or the impedance of circuits in which the pick-up voltages act in parallel or separately is maximized. This type of network at the same time operates to minimize any unwanted pick-up arising by virtue of stray coupling of parts of the circuit to surrounding objects. This type of network is tuned by a single tuning element which is best inserted in the series circuit if its impedance is low and across the parallel circuit if its impedance is high.

These considerations regarding the connecting network apply no matter what type of pick-up is employed, whether loops or dipoles, but loop circuits are more easily shielded and controlled than dipoles.

In the present invention, means has been devised whereby the two signals are combined in such a manner that the very small differences of phase between the component signals are preserved, so that very small loop separations are possible, thus making the physical apparatus much more compact.

Referring to embodiments of the invention shown in Figs. 1 and 2, numerals 1 and 2 designate an arrangement of similar loop antennas, two loops being here shown by way of example, with their centers as at 3 and 4. These loops are spaced from one another and the distance between their centers may be denoted by the letter $d$. As here shown, the loops 1 and 2 are perpendicular to the line 3—4. As shown in Fig. 1, the loops are connected in parallel circuit to common terminals 5 and 6. A common tuning condenser as 9 is connected across the leads as shown. The leads of loop 2 are shown reversed so that when like voltages $e'$ and $e''$ are induced in both loops the output is zero. An electro-static shield 8 is shown surrounding the loops and their connecting leads. The terminals 5 and 6 lead to a radio receiver as at 7, which may be a conventional receiver, or any one of the types of receiver especially designed for radio direction finding and employing the principle of right and left indication. This receiver, it may be noted, presents to the two loops a common terminating impedance and a common detector.

The present invention in its nature and scope comprehends the idea of joining two similar spaced loops in a circuit of low series impedance, differentially and with a common tuning unit and output terminals symmetrically situated between the loops. When such a circuit is acted upon by a plane wave radio signal, no voltage can appear across the output terminals except that due to a difference in phase of the signals induced in the two loops. Thus, while the signal delivered into the receiver may be comparatively weak due to the short separation between the loops and the consequent slight difference of phase, at the same time all static and interfering noises are also greatly reduced and it is possible to operate the receiver down to the level of tube noise.

If $e$ be regarded as the amplitude of the E. M. F. induced in each loop separately and $\phi$ the phase difference, the net effective induced E. M. F. may be shown to be of amplitude $$2e \sin \phi/2 \text{ (see Fig. 4)}$$

In the form of the invention as shown in Figure 2, where the spaced loops 1 and 2 are shown connected in series with the common divided tuning condensers 10 and 11, an advantage is secured in that the output of the spaced loop is less affected in phase by small differences in impedance between the two component loops.

In the modification shown in Fig. 3, a loop fixed rigidly and in parallel relation to the spaced loops is employed as a reference antenna, and is located preferably midway between said main loops as shown in said figure. One advantage of this arrangement lies in the fact that in any system using a right-left indicator, the indications are much steadier both on and off course due to the fact that fading is less severe with loop reception, that intensity of signal reception is not affected by change of angle of incidence of the received ray or beam, also for the reason that better shielding can be secured and that the fore-aft signal direction ambiguity may be resolved.

It should be understood that spaced loops as employed in the present invention may be combined with a vertical antenna to operate as a direction finder which will also be free from night effect error.

One example of an arrangement by which this may be done is shown in Fig. 5. 1 and 2 are spaced loops, which constitute a directional receiving antenna. Numeral 22 designates a vertical doublet, which constitutes the antenna for reference signal. As collector for reference signal any type of antenna may be used that does not change phase of output as the direction of the received ray changes from one side to the other of the plane of the loops. An audio signal generated in oscillator 19 is applied in modulator 18 to the reference signal from 22 modulating or commutating it. Loop signal from 1 and 2 is superposed upon the modulated reference signal in suitable phase relation in combining circuit 17 is then amplified and detected in receiver 20 and the output combined with signal direct from oscillator 19 in indicator 21 to give right-left indication of the bearing of the received radio signal.

With this arrangement when the signal fades or changes its angle of polarization the intensity of the induced E. M. F. in the directional spaced loops and in the reference loop change together preserving a constant ratio of voltage to each other. Thus, by applying AVC controlled by the reference loop to both signals, fluctuations of indication from the above causes may be eliminated.

The ratio of induced voltage in the double loop to that in the single loop is $$A2 \sin \phi/2$$

where A is a factor which may be made a constant of the equipment.

By then applying methods which effectively make use of this ratio, it is possible to measure and indicate the angle $\phi$ and through it angle $\theta$. So long as the angle which the received wave makes with the horizontal is small, $\theta$ is substantially equal to the off-null bearing of the signal.

The modification as shown in Fig. 3 where spaced loops are used in combination with a reference loop, may employ a cathode ray tube to indicate bearing. Referring to said Fig. 3, signals from the spaced loops 1 and 2 and from the reference loop 12 are amplified in separate receivers 13 and 14, the degree of amplification being greater in the amplifier 13 fed from the spaced loops 1 and 2 than in amplifier 15 fed from the reference loop 12, said difference being in the ratio BL/2πd, where B is a constant of the apparatus. If now the outputs are applied respectively to the crossed plates of the cathode ray tube shown at 16 and properly phased by means of a phase shifter shown as at 14, a straight line pattern will be seen, which can be made vertical, say for $\theta=0$ (on-course bearing) and which for any given value of $\phi$ will turn from the vertical an angle $\psi$ such that $$\tan \psi = K \sin \theta$$

where K is a constant of the apparatus; and in this manner an indication is obtained of the bearing of the signal with reference to the plane of the loops. The means here disclosed which employs an auxiliary loop parallel with the pair of spaced loops and rotating with the same provides for the elimination of 90° and 180° ambiguity.

The functioning of a cathode ray tube when used as an indicator may be visualized by reference to Fig. 6. The component motions of the luminous spot are shown as proportional to the amplified reference signal and spaced loop signal respectively, the amplifications being such as to make the factor K equal 2 in the diagram. The resultant line traced by the motion of the spot is shown making an angle $\psi$ with the axis of the reference signal vector. Corresponding to various angles $\psi$ there are marked on the circumference about the tube the angles $\theta$, which are the directions of signal bearing referred to the plane of the spaced loops.

Changes, modifications and equivalent arrangements are contemplated within the scope and spirit of the invention as defined by the appended claims.

I claim:

1. In a radio direction finder, an antenna system comprising spaced loops having their planes perpendicular to their common line of centers; a circuit for conductively and differentially coupling said loops in operative relation, and including a common tuning element and a common terminating impedance in said circuit.

2. In a radio direction finder, a directional antenna system comprising spaced parallel loops having their planes perpendicular to their common line of centers; a circuit for operatively coupling said loops conductively and in opposition; a common tuning means in said circuit; an output circuit connected in parallel to said first-named circuit; and means in said output circuit for comparing and indicating relative phase displacement between the outputs of said loops.

3. In a radio direction finder, an antenna system comprising spaced parallel loops having their planes perpendicular to their common line of centers; a common output circuit coupling said loops in series, and a common tuning element in said circuit; and means fed from said output circuit for comparing and indicating relative phase displacements between the outputs of said loops.

4. In a direction finder, a directional antenna system comprising a pair of loops spaced from one another and having their planes perpendicular to their common line of centers; a circuit conductively and differentially coupling said loops; a common tuning element in said circuit; a common output circuit for said loops and means in said circuit including a receiver for indicating a bearing dependent upon relative phase displacements between the output of said loops.

5. In a radio directional antenna array, a system comprising two spaced loops having their planes perpendicular to their common line of centers; a circuit for closely and differentially coupling said loops in operative relation, and including a common tuning element in said circuit.

6. In a radio directional receiver, an antenna system comprising spaced loops having their planes perpendicular to their common line of centers; a circuit for conductively and differentially coupling said loops in operative relation; common tuning means in said circuit; and a common receiver into which the combined signal output of the loops is fed.

7. In a radio direction finder, a pair of parallel loops spaced from one another and having their planes perpendicular to their common line of centers; a circuit system for operatively coupling said loops conductively and in opposing circuit relation, said circuit including tuning means common to said loops; a separate reference loop spaced in parallelism with said first-named loops, and phase shifting means fed from said reference loop; an amplifier for the energy output of the spaced loops; an amplifier for the energy output of said reference loop; and means responsive to the outputs of said amplifiers to indicate the bearing of a signal dependent upon the phase displacement between the signals picked up by said spaced loops.

8. In a radio direction finder, a pair of parallel loops spaced from one another and having their planes perpendicular to their common line of centers; a circuit system for conductively and differentially coupling said loops, said circuit including a common tuning means connected in the common output of said loops; an auxiliary reference loop interposed in spaced parallel relation between said first-named loops; an amplifier for the signal output of said coacting spaced loops; a phase shifter fed from said reference loop; an amplifier coupled to the shifter for amplifying the signal energy from said reference loop; and means including a cathode ray tube actuated by signals from said amplifiers to give an indication of bearing in response to phase displacements as determined by said first-named spaced loops.

9. In a radio directional system, a directional antenna array comprising a pair of loops spaced from one another, having their planes perpendicular to their common line of centers; a circuit including a tuned impedance through which said loops are closely coupled electrically in opposing relation and having a common output signal; a reference antenna; means for combining in suitable phase the signal outputs of the respective directional array and the reference antenna; means for indicating bearing of the received ray dependent upon the directional properties of said directional antenna array inherent by virtue of the spaced relation of said loops.

10. In a direction finder the combination which includes a pair of directional antennas and an auxiliary directional antenna, said antennas being rotatably mounted and having similar directional characteristics, an indicator having separate control means for causing a resultant deflection, means for applying the output potential from said auxiliary antenna to one of said control means, and means for applying the difference of the output potentials from said pair of antennas to the other of said control means.

11. In a direction finder the combination which includes a pair of directional antennas and an auxiliary directional antenna, said antennas being rotatably mounted and having similar directional characteristics, a cathode ray indicator having vertical and horizontal deflecting means, means for applying the output potential from said auxiliary antenna to one of said deflecting means, and means for applying the difference of the output potentials from said pair of antennas to the other of said deflecting means.

12. In a direction finder the combination which includes a pair of frame antennas and an auxiliary frame antenna mounted in parallel planes and adapted to rotate about a common axis, an indicator having separate control means for causing a resultant deflection, means for applying the output potential of said auxiliary frame antenna to one of said control means, and means for applying the difference of the output potentials from said pair of frame antennas to the other of said control means.

13. In a direction finder the combination which includes a pair of directional antennas and an auxiliary directional antenna, said antennas being rotatably mounted and having similar directional characteristics, a pair of receivers, means for applying the output potentials of said pair of antennas in phase opposition to one of said receivers, means for applying the output potential of said auxiliary antenna to the other of said receivers, an indicated, means for connecting the output of said receivers to said indicator, and means for adjusting the relative phase of the output potentials of said receivers.

14. In a direction finder the combination which includes a pair of directional antennas and an auxiliary directional antenna mounted in a row and all oriented in parallel planes to have similar directional characteristics when considered individually, said antennas being rotatable as a unit about an axis perpendicular to the line established by said row of antennas, an indicator having separate control means for causing a resultant deflection, means for applying the output potential from said auxiliary antenna to one of said control means, and means for applying the difference of the output potentials from said pair of antennas to the other of said control means.

15. In a direction finder the combination which includes a pair of directional antennas and an auxiliary directional antenna mounted in a row and all oriented in parallel planes to have similar directional characteristics when considered individually, said antennas being rotatable as a unit about an axis perpendicular to the line established by said row of antennas, a cathode ray indicator having vertical and horizontal deflecting means, means for applying the output potential from said auxiliary antenna to one of said deflecting means, and means for applying the difference of the output potentials from said pair of antennas to the other of said deflecting means.

16. In a direction finder the combination which includes a pair of loop antennas and an auxiliary loop antenna mounted in a row and all oriented in parallel planes to have similar directional characteristics when considered individually, said antennas being rotatable as a unit about an axis perpendicular to the line established by said row of antennas, an indicator having separate control means for causing a resultant deflection, means for applying the output potential of said auxiliary loop antenna to one of said control means, and means for applying the difference of the output potentials from said pair of loop antennas to the other of said control means.

17. In a direction finder the combination which includes a pair of directional antennas and an auxiliary directional antenna, mounted in a row and all oriented in parallel planes to have similar directional characteristics when considered individually, said antennas being rotatable as a unit about an axis perpendicular to the line established by said row of antennas, a pair of receivers, means for applying the output potentials of said pair of antennas in phase opposition to one of said receivers, means for applying the output potential of said auxiliary antenna to the other of said receivers, an indicator having separate control means for causing a resultant deflection, means for connecting the output of said receivers to respective control means of said indicator, and means for adjusting the relative phase of the output potentials of said receivers.

18. In a direction finder the combination which includes a pair of loop antennas spaced and oriented in parallel planes to have similar directional characteristics when considered individually, an auxiliary loop antenna mounted intermediate the antennas of said pair and oriented in a plane parallel to the planes of said pair of antennas, said antennas being rotatable as a unit about an axis perpendicular to the line between said pair of antennas, a cathode ray indicator having vertical and horizontal deflecting means, means for applying the output potential from said auxiliary loop antenna to one of said deflecting means, and means for applying the difference of the output potentials from said pair of loop antennas to the other of said deflecting means.

19. In a radio direction finder a pair of spaced parallel similar loop antennas, a third loop antenna fixed parallel to the first pair, and a phase meter responsive to the outputs of the paired loops compounded in opposition and to the output of the reference loop.

PAUL B. TAYLOR.